(12) United States Patent
Papadopoulos et al.

(10) Patent No.: US 12,003,071 B2
(45) Date of Patent: Jun. 4, 2024

(54) METHOD FOR GENERATING ULTRASHORT PULSES

(71) Applicants: ECOLE POLYTECHNIQUE, Palaiseau (FR); CENTRE NATIONAL DE LA RECHERCHE SCIENTIFIQUE, Paris (FR); UNIVERSITE PARIS SACLAY, Saint-Aubin (FR)

(72) Inventors: Dimitrios Papadopoulos, Antony (FR); Xavier Delen, Antony (FR); Frederic Druon, Orsay (FR)

(73) Assignees: ECOLE POLYTECHNIQUE, Palaiseau (FR); CENTRE NATIONAL DE LA RECHERCHE SCIENTIFIQUE, Paris (FR); UNIVERSITE PARIS SACLAY, Saint-Aubin (FR)

( * ) Notice: Subject to any disclaimer, the term of this patent is extended or adjusted under 35 U.S.C. 154(b) by 790 days.

(21) Appl. No.: 17/048,921

(22) PCT Filed: Apr. 19, 2019

(86) PCT No.: PCT/EP2019/060227
§ 371 (c)(1),
(2) Date: Oct. 19, 2020

(87) PCT Pub. No.: WO2019/202145
PCT Pub. Date: Oct. 24, 2019

(65) Prior Publication Data
US 2021/0175677 A1    Jun. 10, 2021

(30) Foreign Application Priority Data
Apr. 20, 2018   (FR) ..................... 18 53519

(51) Int. Cl.
*G02F 1/35* (2006.01)
*G02F 1/39* (2006.01)
*H01S 3/00* (2006.01)

(52) U.S. Cl.
CPC .......... *H01S 3/0057* (2013.01); *G02F 1/3511* (2013.01); *G02F 1/3515* (2013.01);
(Continued)

(58) Field of Classification Search
CPC .... G02F 1/3511; G02F 1/3515; G02F 1/3519; G02F 1/392; G02F 1/3555; H01S 3/0057; H01S 3/0071; H01S 3/005
See application file for complete search history.

(56) References Cited

U.S. PATENT DOCUMENTS 5,015,054 A    5/1991  Chaffee
5,150,248 A    9/1992  Alfano et al.
(Continued)

FOREIGN PATENT DOCUMENTS

CA    2441173 C  * 10/2012 .......... G02F 1/3515
CN    1547292 A    11/2004
(Continued)

OTHER PUBLICATIONS

International Search Report dated Jul. 9, 2019 in PCT/EP2019/060227 (submitting English translation only), 3 pages.
(Continued)

*Primary Examiner* — Mustak Choudhury
(74) *Attorney, Agent, or Firm* — BakerHostetler

(57) ABSTRACT

A method for generating ultrashort pulses includes directing a master beam having ultrashort pulses and at least one slave beam through an optical gate material. The intensity of the slave beam upstream of the optical gate material is lower than that of the master beam upstream of the optical gate material. The optical gate material and the pulses of the
(Continued)

Figure 1:
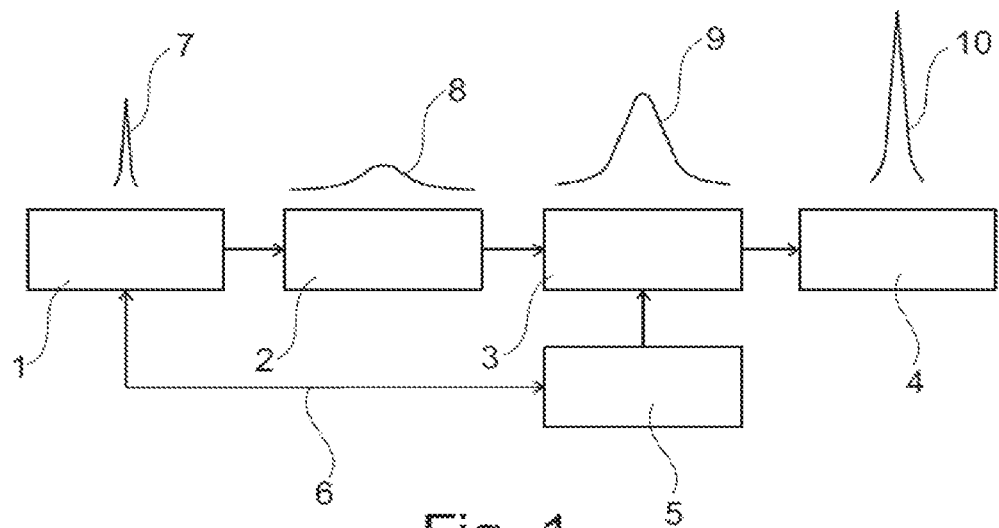

master beam are chosen to induce a Kerr effect when the master beam passes through the optical gate material, the Kerr effect producing a modulation of the phase of the slave beam in association with pulses of the master beam when the slave beam passes through the optical gate material. The modulation of the phase of the slave beam is transformed into a modulation of the amplitude thereof using a complementary optical device to generate a slave beam downstream of the optical gate material having ultrashort pulses.

19 Claims, 2 Drawing Sheets

(52) U.S. Cl.
CPC ............ *G02F 1/3519* (2013.01); *G02F 1/392* (2021.01); *H01S 3/0071* (2013.01)

(56) References Cited

U.S. PATENT DOCUMENTS

| | | | |
|---|---|---|---|
| 5,373,381 A | 12/1994 | Alfano et al. | |
| 5,463,485 A | 10/1995 | Alfano et al. | |
| 6,298,180 B1 | 10/2001 | Ho | |
| 2008/0085123 A1 | 4/2008 | Van Devender et al. | |
| 2008/0225383 A1* | 9/2008 | Theberge ................ | G02F 1/353 359/326 |
| 2009/0251703 A1* | 10/2009 | Edamatsu ............ | G02F 1/3519 356/460 |
| 2010/0014546 A1* | 1/2010 | Matsumoto ............ | H01S 3/168 257/E21.53 |
| 2013/0170513 A1* | 7/2013 | Matsuo ................ | G02F 1/3511 372/29.021 |

FOREIGN PATENT DOCUMENTS

| | | |
|---|---|---|
| CN | 1731632 A | 2/2006 |
| CN | 101771235 A | 7/2010 |
| CN | 104051945 A | 9/2014 |
| EP | 0 409 660 A2 | 1/1991 |
| JP | 2-193126 A | 7/1990 |
| JP | 4-258033 A | 9/1992 |
| JP | 5-5909 A | 1/1993 |
| JP | 10-90733 A | 4/1998 |
| JP | 2000-231128 A | 8/2000 |
| JP | 2002-258333 A | 9/2002 |
| JP | 2006-30295 A | 2/2006 |
| WO | 2007/066686 A1 | 6/2007 |

OTHER PUBLICATIONS

French Search Report dated Jun. 4, 2019 in French Patent Application No. 1853519 (with English translation of Category of Cited Documents), 4 pages.

Kanbara, H., et al., "Highly efficient ultrafast optical Kerr shutters with the use of organic nonlinear materials", Journal of the Optical Society of America—B., vol. 11, No. 11, Nov. 1, 1994, XP055538171, pp. 2216-2223.

Zhang, Q.F., et al., "Ultrafast optical Kerr effect of Ag—BaO composite thin films", Applied Physics Letters, vol. 82, No. 6, Feb. 10, 2003, XP012034766, pp. 958-960.

English translation of Notice of Reasons for Rejection filed in Japanese Application No. 2021-506063, dated Nov. 28, 2022.

First Office Action issued in the Chinese Patent Application No. 201980037087.0 dated Aug. 24, 2023, with English translation.

Asobe, et al., "Ultrafast all-optical switching using highly nonlinear chalcogenide glass fiber", Photonics Technology Letters, vol. 4, Issue 4, pp. 362-365, 1992.

\* cited by examiner

STATE OF THE ART

METHOD FOR GENERATING ULTRASHORT PULSES

The present invention relates to the methods for generating ultrashort pulses and installations for implementing these methods.

STATE OF THE ART

It is known practice to generate ultrashort pulses using installations relying on a technology of optical parametric amplification of pulses with frequency drift (also called OPCPA, for "Optical Parametric Chirped-Pulse Amplification"). These OPCPA amplifiers comprise a non-linear crystal ensuring the transfer of energy between a pulse of a strongly energetic pump beam and a pulse of a wide spectrum signal beam, temporally stretched and with little energy. Before being amplified, a pulse stretcher is used to temporally stretch the ultrashort pulse of the signal beam so as to lower its peak power. For there to be parametric amplification, the pulses of the pump and signal beams must be temporally superimposed in the crystal. The OPCPA amplifier is therefore associated with a temporal synchronization of the laser sources generating the pump and signal beams. An optical compressor is used to recompress the pulse of the signal beam.

In order for the pulses of the pump and signal beams to be temporally superimposed in the crystal, it is known practice to use two independent laser sources with electronically synchronized mode locking, one of the laser sources being a titanium sapphire oscillator (TiS) generating the ultrashort pulses of the signal beam. However, the electronic synchronization results in long term phase drifts due to the thermal drift and the phase noise.

One alternative consists in having the two independent laser sources optically synchronized. This type of synchronization is however complex to implement and lacks long term reliability.

Another solution consists in using one and the same laser source, a TiS oscillator with very wide spectral band, allowing both for the generation of the pulses of the pump beam and the pulses of the signal beam. However, the TiS oscillators have a relatively high cost and are complex to implement, in addition to requiring significant maintenance. Moreover, these oscillators entail complex amplification configurations, notably multi-stage and bulky, associated with highly sensitive and long pulse stretchers and compressors, which contributes to problems of stability of the pulses generated, in particular for the OPCPA amplifiers operating in the range of a few picoseconds (ps-OPCPA) which require a very strict synchronization (<100 fs) between the pulses of the pump and signal beams to guarantee a high spectral stability of the amplified signal.

Another limitation of the OPCPA technology is linked to its pumping source, notably its long term reliability. The efficiency of the ps-OPCPA amplifiers is, moreover, limited by the reduced capacity for forming optimized pulses in the picosecond range.

There remains a need to further refine the methods for generating ultrashort pulses, and notably for enhancing the temporal synchronization between two independent laser sources.

SUMMARY OF THE INVENTION

The present invention aims to refine the methods for generating ultrashort pulses and notably to remedy all or some of the above drawbacks. It achieves this by virtue of a method for generating ultrashort pulses, wherein:

a master beam having ultrashort pulses and at least one slave beam are directed through an optical gate material, the optical gate material and the pulses of the master beam being chosen so as to induce a Kerr effect when the master beam passes through the optical gate material, the Kerr effect producing a modulation of the phase of the slave beam in association with the pulses of the master beam when the slave beam passes through the optical gate material, and the modulation of the phase of the slave beam is transformed into a modulation of the amplitude thereof using a complementary optical device, so as to generate a slave beam downstream of the optical gate material having ultrashort pulses.

"Ultrashort pulses" should be understood to be pulses of a duration of between 5 femtoseconds (fs) and 100 picoseconds (ps).

The method according to the invention has the advantage of offering a robust solution exhibiting a long term reliability for the generation of ultrashort pulses.

The invention can be implemented directly in the systems that are already in operation without major modifications, which can make it possible to reduce the cost and the complexity of its implementation.

The optical gate material has nonlinear properties.

The optical gate material can be any mineral, organic or composite transparent material. The optical gate material can be a solid such as glass or a crystal, a gas, a liquid, and, if necessary, take the form of a wave guide, such as a molten silica capillary or an optical fiber.

The optical gate material is, for example, an SF54 or SF14 glass.

The slave beam upstream of the optical gate material can be continuous or pulsed. It is preferably pulsed.

The intensity of a laser beam is defined as being the peak power per unit of surface area.

The intensity of the master beam is sufficient to induce a Kerr effect when the master beam passes through the optical gate material and for this Kerr effect to produce a modulation of the phase of the slave beam in association with the pulses of the master beam when the slave beam passes through the optical gate material. The modulation of the phase of the slave beam depends on the nonlinearity of the material used as optical gate and its wavelength. The intensity of the master beam is preferably such that the value of the B integral (B-integral or B-int) is between 1 and $\pi$, with B-int=$(2\pi L/\lambda)*I*n2$, in which L is the length of the optical gate material, $\lambda$, is the central wavelength of the master beam, I is the intensity of the master beam and n2 is the nonlinear refractive index of the optical gate material.

The intensity of the slave beam upstream of the optical gate material can be lower than that of the master beam upstream of the optical gate material.

The intensity of the slave beam upstream of the optical gate material is, for example, lower by a factor of at least 10 than the intensity of the master beam upstream of the optical gate material.

The pulses of the master and slave beams upstream of the optical gate material can be temporally superimposed, this superimposition being preferably obtained by means of an electronic synchronization. The electronic synchronization can be performed by means of an optical signal detector and generator.

The electronic synchronization can ensure a precision less than or equal to 500 ps, better less than or equal to 100 ps, and even better less than or equal to 10 ps.

The master and slave beams can have different respective central wavelengths. These central wavelengths can be chosen arbitrarily. The master beam, for example, has a central wavelength centered on 800 nm. The slave beam, for example, has a central wavelength centered on 1064 nm.

The pulses of the master and slave beams upstream of the optical gate material can have different durations.

The duration of a pulse is defined as being the width of the peak at −3 dB.

The pulses of the slave beam upstream of the optical gate material can have a duration greater than that of the pulses of the master beam upstream of the optical gate material.

The duration of the ultrashort pulses of the slave beam generated downstream of the optical gate material can be identical or close to the duration of the pulses of the master beam.

The duration of the pulses of the master beam and the duration of the ultrashort pulses of the slave beam generated downstream of the optical gate material can be between 5 fs and 100 ps.

The output parameters of the ultrashort pulses of the slave beam generated downstream of the optical gate material, such as their duration and their temporal form, can be variable. For example, it is possible to adjust the stretching of the master beam to act on the duration of the ultrashort pulse generated or to spectrally filter the master beam to act on the form of the ultrashort pulse generated.

The modulation of the phase of the slave beam by the pulses of the master beam when the slave beam passes through the optical gate material can be instantaneous or be performed with a delay less than or equal to 20 fs, better less than or equal to 10 fs, and even better less than or equal to 5 fs. This delay can depend on the exact nature of the material used as optical gate.

The modulation of the phase of the slave beam by Kerr effect can be accompanied by a modulation of its polarization when the slave beam passes through the optical gate material when the master and slave beams at the input of the optical gate material are polarized differently, and the complementary optical device can comprise means for adjusting the state of polarization of the slave beam upstream of the optical gate material and a downstream polarizer downstream of the optical gate material, crossed with the polarization of the slave beam at the input of the optical gate material, to block the part of the slave beam that is not polarization-modulated.

"Polarized differently" should be understood to mean that the master and slave beams at the input of the optical gate material have different polarization directions.

For example, the master and slave beams at the input of the optical gate material are polarized linearly and differently, the polarization of the master beam with respect to the polarization of the slave beam being different by 90° as an absolute value.

The means for adjusting the state of polarization of the slave beam upstream of the optical gate material can comprise a polarizer and/or a birefringent plate.

In a variant, the complementary optical device comprises an interferometer configured to make at least one slave beam having passed through the optical gate material interfere with at least one other beam from the same source as the slave beam in order to produce an amplitude modulation of the slave beam.

The interferometer can be a Sagnac interferometer in which the slave beam is split into two beams that are propagated in opposite directions through the optical gate material and recombined after having passed through the latter. The use of a Sagnac interferometer has the advantage of great stability.

In a variant, the modulation of the phase of the slave beam by Kerr effect can be accompanied by a modulation of its divergence when the slave beam passes through the optical gate material in the presence of a spatial gradient, notably radial, of intensity of the master beam within the optical gate material, and the complementary optical device can comprise a spatial filter downstream of the optical gate material to block the part of the slave beam that is not divergence-modulated.

The slave beam, after having passed through the optical gate material, can be amplified within a laser amplifier.

The ultrashort pulses of the slave beam generated downstream of the optical gate material and the pulses of the master beam downstream of the optical gate material can be temporally superimposed. The precision of this temporal synchronization can be comparable to the delay of the nonlinear response to the optical gate material, i.e. comparable to the delay with which the modulation of the phase of the slave beam by the pulses of the master beam is performed when the slave beam passes through the optical gate material. The precision of this temporal synchronization can be less than or equal to 20 fs, better less than or equal to 10 fs, and even better less than or equal to 5 fs.

The pulses of the master beam at the output of the optical gate material can be used or not as signal beam of an OPCPA.

Another subject of the invention, according to another of its aspects, is an installation for generating ultrashort pulses, notably for implementing the method according to the invention as defined above, comprising:
- a first laser source generating a master beam having ultrashort pulses,
- at least one second laser source generating at least one slave beam,
- an optical gate material disposed on the path of the master and slave beams, the optical gate material and the pulses of the master beam being chosen so as to induce a Kerr effect when the master beam passes through the optical gate material, the Kerr effect producing a modulation of the phase of the slave beam in association with the pulses of the master beam when the slave beam passes through the optical gate material.

The installation can comprise a complementary optical device for transforming the modulation of the phase of the slave beam into a modulation of the amplitude thereof.

The slave beam upstream of the optical gate material can have a lower intensity than the master beam.

The first and second laser sources can be independent.

The first laser source can be of femtosecond or picosecond type or can be at least a part of a signal beam of an OPCPA.

The second laser source can be of SLM (Single Longitudinal Mode) type and/or triggered oscillator (Q-switch) type, or can be a gain-modulated source.

The installation according to the invention can comprise means for directing the master and slave beams through the optical gate material. The installation comprises, for example, a mirror, notably dichroic or curved, a lens and/or a phase mask.

The installation can comprise optical amplification means for amplifying the slave beam downstream of the optical gate material. The installation comprises, for example, an optical fiber or massive crystal amplifier.

The modulation of the phase of the slave beam by Kerr effect can be accompanied by a modulation of its polarization when the slave beam passes through the optical gate material when the master and slave beams at the input of the optical gate material are polarized differently, and the complementary optical device can comprise means for adjusting the state of polarization of the slave beam upstream of the optical gate material and a downstream polarizer downstream of the optical gate material, crossed with the polarization of the slave beam at the input of the optical gate material, to block the part of the slave beam that is not polarization modulated.

For example, the master and slave beams at the input of the optical gate material are polarized linearly and differently, the polarization of the master beam with respect to the polarization of the slave beam being different by 90° as an absolute value.

In a variant, the complementary optical device comprises an interferometer configured to make at least one slave beam having passed through the optical gate material interfere with at least one other beam from the same source as the slave beam in order to produce an amplitude modulation of the slave beam.

The interferometer can, as mentioned above, be a Sagnac interferometer in which the slave beam is split into two beams that are propagated in opposite directions through the optical gate material and recombined after having passed through the latter. In another variant, the modulation of the phase of the slave beam by Kerr effect can be accompanied by a modulation of its divergence when the slave beam passes through the optical gate material in the presence of a spatial gradient, notably radial, of intensity of the master beam within the optical gate material, and the complementary optical device can comprise a spatial filter downstream of the optical gate material to block the part of the slave beam that is not divergence-modulated.

Yet another subject of the invention, according to another of its aspects, is the use of an installation according to the invention as defined above, to temporally synchronize a pump source and a signal source of an OPCPA amplifier, for pump-probe spectroscopy or for the production of high-intensity lasers.

Figure 2:
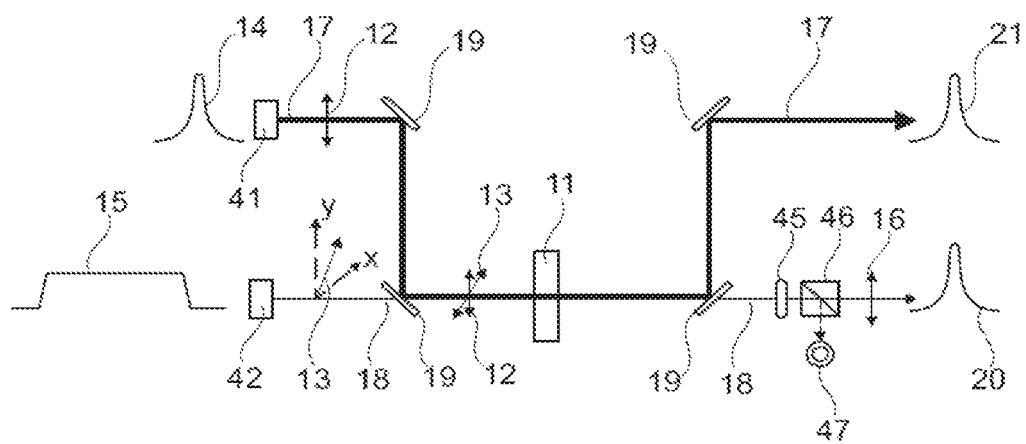
Figure 3:
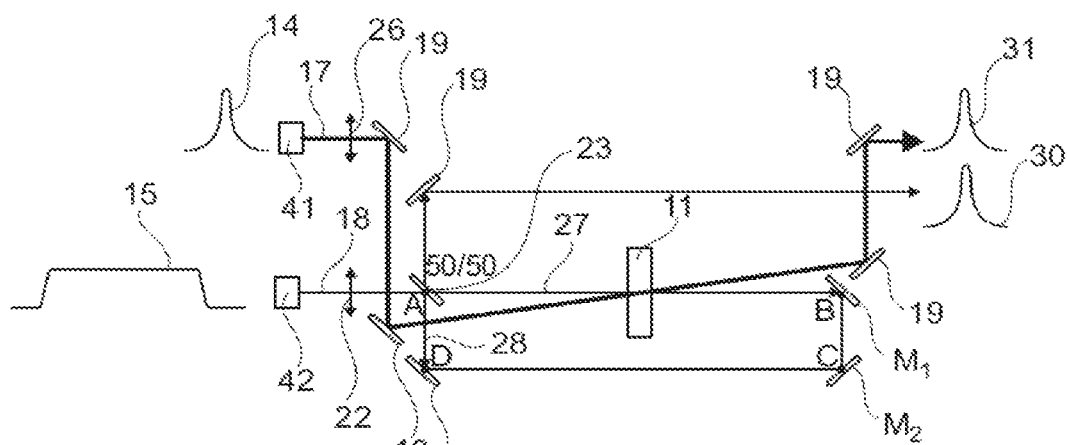
Figure 4:
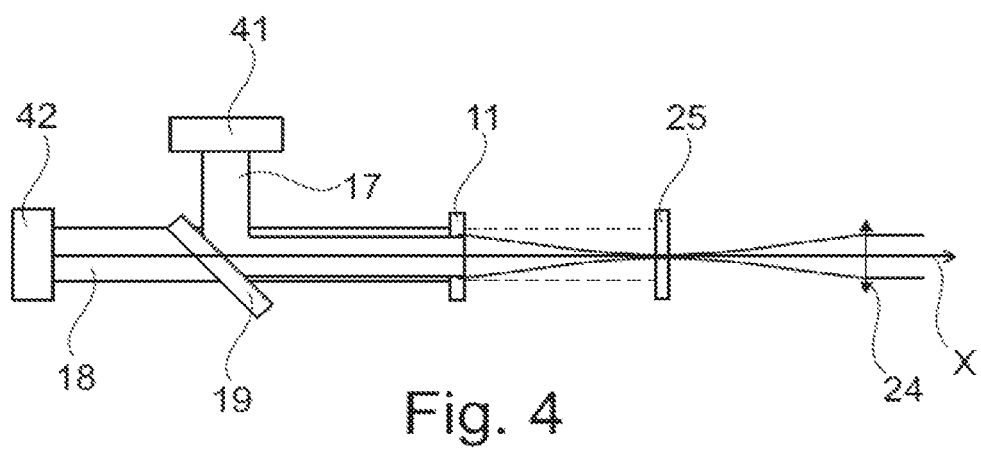

The invention will be able to be better understood on reading the following detailed description, of a nonlimiting exemplary implementation thereof, and on studying the attached drawing, in which:

FIG. 1 schematically represents an OPCPA amplifier according to the prior art, and FIGS. 2 to 4 schematically represent examples of installations according to the invention.

FIG. 1 shows a diagram of an OPCPA amplifier according to the prior art. A pump source 5 generates a pump beam having a high energy pulse. A signal source 1 generates a signal beam having a low-energy ultrashort pulse 7, which is temporally stretched using a pulse stretcher 2 so as to obtain a stretched pulse 8 having a lowered peak power. A time synchronization system 6 makes it possible to synchronize the pump source 5 and the signal source 1. An optical parametric amplifier 3 comprises a non-linear medium allowing a transfer of energy between the pulse of the pump beam and the stretched pulse 8 of the signal beam so as to obtain an amplified pulse 9 of the signal beam which is recompressed ideally to its initial duration using a compressor 4 so as to obtain a pulse 10 of the signal beam of very high peak power.

FIG. 2 shows an example of installation according to the invention comprising, upstream of an optical gate material 11, a first laser source 41 generating a pulse 14 of a master beam 17 and a second laser source 42 generating a pulse 15 of a slave beam 18.

As a variant, the master beam 17 corresponds to a part or all of the signal beam generated by the signal source 1 of the OPCPA amplifier represented in FIG. 1.

The master 17 and slave 18 beams are polarized linearly upstream of the optical gate material 11, and their state, i.e. their direction, of polarization is different from one another, excluding the case in which the polarization of the master beam with respect to the polarization of the slave beam is 90° as an absolute value. The master 17 and slave 18 beams are for example polarized at 45° to one another, as illustrated by the arrows 12 and 13 which indicate the state of polarization of the master 17 and slave 18 beams, respectively.

When the slave beam 18 passes through the optical gate material 11, the slave beam is phase-modulated by the pulse 14 of the master beam 17. The modulation of the phase of the slave beam 18 results in an instantaneous modification of the polarization of the slave beam 18.

A birefringent plate 45 is disposed downstream of the optical gate material 11, on the path of the slave beam 18 leaving the optical gate material 11. This birefringent plate 45 makes it possible to manipulate the polarization of the slave beam 18 leaving the optical gate material 11 so as to orient this polarization with respect to a polarizer cube 46 disposed downstream of the birefringent plate 45. This polarizer cube 46 makes it possible to reflect the transverse electrical polarization of the slave beam 18 leaving the optical gate material 11. The element 47 represents the state of polarization reflected by the polarizer cube 46.

At the output of the polarizer cube 46, an ultrashort pulse 20 is obtained which is temporally superimposed on the pulse 21 of the master beam 17 leaving the optical gate material 11. The arrow 16 indicates the state of polarization of the slave beam 18 at the output of the polarizer cube 46.

As a variant, the birefringent plate 45 and the polarizer cube 46 are replaced by any element that makes it possible to manipulate and project the polarization of the slave beam 18 according to an axis so as to reject the portion of the slave beam 18 for which the polarization is not modulated. The polarizer cube 46 can for example be replaced by a linear polarizer.

Mirrors 19 are configured so as to direct the master beam 17 at the input and at the output of the optical gate material 11.

The master beam 17 has, for example, a central wavelength centered on 800 nm and has a pulse 14 of a duration of 15 picoseconds upstream of the optical gate material 11.

The slave beam 18 has, for example, a central wavelength centered on 1064 nm and has, upstream of the optical gate material 11, a pulse 15 of a duration longer than the pulse 14 of the master beam 17.

FIG. 3 shows another example of installation according to the invention comprising, upstream of the optical gate material 11, a first laser source 41 generating a pulse 14 of a master beam 17 and a second laser source 42 generating a pulse 15 of a slave beam 18. The master 17 and slave 18 beams are polarized linearly upstream of the optical gate material 11 and their state, i.e. their direction, of polarization is identical. The master 17 and slave 18 beams are polarized in parallel upstream of the optical gate material 11, as illustrated by the arrows 26 and 27 which indicate the state of polarization of the master 17 and slave 18 beams, respectively.

The device comprises a Sagnac interferometer comprising a semi-reflecting plate 23 which is disposed on the path of the slave beam 18, at 45° to its direction of propagation, and mirrors M1, M2 and M3.

The slave beam 18 is directed toward the Sagnac interferometer at the input point A, where the semi-reflecting plate 23 makes it possible to split the slave beam 18 into two beams, one refracted 27 and the other reflected 28.

The mirrors M1, M2 and M3 make it possible to direct the refracted beam 27 along the optical path ABCDA and the reflected beam 28 along the optical path ADCBA.

The refracted 27 and reflected 28 beams pass through the optical gate material 11 in opposite directions and are recombined after having passed through the latter.

At the output of the optical gate material 11, an ultrashort pulse 30 is obtained which is temporally superimposed on the pulse 31 of the master beam 17 leaving the optical gate material 11.

Mirrors 19 are configured so as to direct, on the one hand, the master beam 17 through the optical gate material 11 to produce a Kerr effect and, on the other hand, the master and slave beams at the output of the optical gate material 11.

FIG. 4 shows another example of installation according to the invention. The slave beam 18 generated by the second laser source 42 and the master beam 17 generated by the first laser source 41 are directed through the optical gate material 11. A mirror 19 makes it possible to direct the master beam 17 through the optical gate material 11. This mirror 19 can be dichroic. When the slave beam 18 passes through the optical gate material 11, the slave beam is phase-modulated by the master beam 17. The modulation of the phase of the slave beam 18 results in an instantaneous modification of the divergence of at least a part of the slave beam 18. A spatial filter 25 is disposed downstream of the optical gate material 11, on the path of the slave beam 18 leaving the optical gate material 11.

The spatial filter 25 can be an orifice, notably of circular form. The diameter of the orifice can be between 5 and 500 µm.

The spatial filter 25 is configured so as to block the part of the slave beam 18 that has not undergone instantaneous modification of the divergence. A convergent lens 24 is disposed downstream of the spatial filter 25 on the path of the slave beam 18 leaving the spatial filter 25. The rays of the slave beam 18 passing through the object focal point of the lens 24 and passing through the latter leave parallel to the optical axis X.

The examples of installations according to the invention represented in FIGS. 2 to 4 can be used as time synchronization system 6 of FIG. 1 to temporally synchronize the pump source 5 and the signal source 1 of an OPCPA amplifier.

The term "comprising" should be understood with its currently accepted meaning, that is to say as being synonymous with "comprising at least one", unless stipulated otherwise.

The invention claimed is:

1. A method for generating ultrashort pulses, comprising:
   directing a master beam having ultrashort pulses and at least one slave beam through an optical gate material, the intensity of the slave beam upstream of the optical gate material being lower than that of the master beam upstream of the optical gate material, the optical gate material and the pulses of the master beam being chosen so as to induce a Kerr effect when the master beam passes through the optical gate material, the Kerr effect producing a modulation of the phase of the slave beam in association with the pulses of the master beam when the slave beam passes through the optical gate material; and
   transforming the modulation of the phase of the slave beam into a modulation of an amplitude thereof using a complementary optical device, so as to generate a slave beam downstream of the optical gate material having ultrashort pulses, so that the ultrashort pulses of the slave beam generated downstream of the optical gate material and the pulses of the master beam downstream of the optical gate material are superimposed temporally; and
   using the pulses of the master beam downstream of the optical gate material as a signal beam of an Optical Parametric Chirped-Pulse Amplification (OPCPA) amplifier and using the pulses of the slave beam downstream of the optical gate material as a pump beam of the OPCPA amplifier.

2. The method as claimed in claim 1, the slave beam upstream of the optical gate material being continuous or pulsed.

3. The method as claimed in claim 1, the pulses of the master and slave beams upstream of the optical gate material being superimposed temporally.

4. The method as claimed in claim 1, the master and slave beams having different central wavelengths.

5. The method as claimed in claim 1, the master beam having a central wavelength centered on 800 nm.

6. The method as claimed in claim 1, the slave beam having a central wavelength centered on 1064 nm.

7. The method as claimed in claim 1, the modulation of the phase of the slave beam by the pulses of the master beam when the slave beam passes through the optical gate material being instantaneous or being performed with a delay less than or equal to 20 fs.

8. The method as claimed in claim 1, the modulation of the phase of the slave beam by Kerr effect being accompanied by a modulation of its polarization when the slave beam passes through the optical gate material when the master and slave beams at the input of the optical gate material are polarized differently, the complementary optical device comprising means for adjusting the state of polarization of the slave beam upstream of the optical gate material and a downstream polarizer downstream of the optical gate material, crossed with the polarization of the save beam at the input of the optical gate material, to block the part of the slave beam that is not polarization-modulated.

9. The method as claimed in claim 1, the complementary optical device comprising an interferometer configured to make at least one slave beam having passed through the optical gate material interfere with at least one other beam from the same source as the slave beam in order to produce the amplitude modulation of the slave beam.

10. The method as claimed in claim 9, the interferometer being a Sagnac interferometer in which the slave beam is split into two beams that are propagated in opposite directions through the optical gate material and recombined after having passed through the latter.

11. The method as claimed in claim 1, the modulation of the phase of the slave beam by Kerr effect being accompanied by a modulation of its divergence when the slave beam passes through the optical gate material in the presence of a spatial gradient of intensity of the master beam within the optical gate material, the complementary optical device comprising a spatial filter downstream of the optical gate material to block the part of the slave beam that is not divergence-modulated.

12. The method as claimed in claim 1, wherein the slave beam, after having passed through the optical gate material, is amplified within a laser amplifier.

13. A system for generating ultrashort pulses, comprising:
a first laser source generating a master beam having ultrashort pulses;
at least one second laser source generating at least one slave beam;
an optical gate material disposed on the path of the master and slave beams, the intensity of the slave beam upstream of the optical gate material being lower than that of the master beam upstream of the optical gate material, the optical gate material and the pulses of the master beam being chosen so as to induce a Kerr effect when the master beam passes through the optical gate material, the Kerr effect producing a modulation of the phase of the slave beam in association with the pulses of the master beam when the slave beam passes through the optical gate material; and
a complementary optical device for transforming the modulation of the phase of the slave beam into a modulation of an amplitude thereof, so that the ultrashort pulses of the slave beam generated downstream of the optical gate material and the pulses of the master beam downstream of the optical gate material are superimposed temporally; and
an Optical Parametric Chirped-Pulse Amplification (OPCPA) amplifier, wherein the pulses of the master beam downstream of the optical gate material is used as a signal beam of the OPCPA amplifier and the pulses of the slave beam downstream of the optical gate material is used as a pump beam of the OPCPA amplifier.

14. The system as claimed in claim 13, the second laser source being of SLM type.

15. The system as claimed in claim 13, comprising optical amplification means for amplifying the slave beam downstream of the optical gate material.

16. The system as claimed in claim 13, the modulation of the phase of the slave beam by Kerr effect being accompanied by a modulation of its polarization when the slave beam passes through the optical gate material when the master and slave beams at the input of the optical gate material are polarized differently, the complementary optical device comprising means for adjusting the state of polarization of the slave beam upstream of the optical gate material and a downstream polarizer downstream of the optical gate material, crossed with the polarization of the slave beam at the input of the optical gate material, to block the part of the slave beam that is not polarization-modulated.

17. The system as claimed in claim 13, the complementary optical device comprising an interferometer configured to make at least one slave beam having passed through the optical gate material interfere with at least one other beam from the same source as the slave beam in order to produce the amplitude modulation of the slave beam.

18. The system as claimed in claim 17, the complementary optical device comprising a Sagnac interferometer in which the slave beam is split into two beams that are propagated in opposite directions through the optical gate material and recombined after having passed through the latter.

19. The system as claimed in claim 13, the modulation of the phase of the slave beam by Kerr effect being accompanied by a modulation of its divergence when the slave beam passes through the optical gate material in the presence of a spatial gradient of intensity of the master beam within the optical gate material, the complementary optical device comprising a spatial filter downstream of the optical gate material to block the part of the slave beam that is not divergence-modulated.

* * * * *